(12) United States Patent
Rao

(10) Patent No.: US 12,271,200 B1
(45) Date of Patent: Apr. 8, 2025

(54) AUTONOMOUS VEHICLE, MOTION, AND OBJECT PREDICTABILITY SYSTEM

(71) Applicant: Sanjay Kaliputnam Rao, Palo Alto, CA (US)

(72) Inventor: Sanjay Kaliputnam Rao, Palo Alto, CA (US)

( * ) Notice: Subject to any disclaimer, the term of this patent is extended or adjusted under 35 U.S.C. 154(b) by 0 days.

(21) Appl. No.: 16/558,077

(22) Filed: Aug. 31, 2019

Related U.S. Application Data

(60) Provisional application No. 62/774,129, filed on Nov. 30, 2018.

(51) Int. Cl.
*G05D 1/00* (2024.01)
*B60W 30/09* (2012.01)
*B60W 30/095* (2012.01)
*G06V 20/58* (2022.01)

(52) U.S. Cl.
CPC .......... *G05D 1/0221* (2013.01); *B60W 30/09* (2013.01); *B60W 30/0956* (2013.01); *G05D 1/0088* (2013.01); *G06V 20/58* (2022.01); *G06V 20/584* (2022.01)

(58) Field of Classification Search
CPC .. G05D 1/0221; G05D 1/0088; G05D 1/0061; G05D 1/021; G05D 1/0214; G05D 1/0223; G05D 2201/0218; G06K 9/00805; G06K 9/00825; B60W 30/09; B60W 30/0956; B60W 60/00; B60W 60/001; B60W 60/0011; B60W 60/0015; B60W 60/0017; B60W 60/0027; B60W 60/00272; B60W 60/00274; B60W 60/00276; B60W 2554/40; B60W 2554/4049; B60W 2554/80; B60W 2540/225; B60W 60/007; G06V 20/58; G06V 20/584

USPC .......................................................... 701/26
See application file for complete search history.

(56) References Cited

U.S. PATENT DOCUMENTS

| | | | |
|---|---|---|---|
| 9,501,932 B2 * | 11/2016 | Sakai | G08G 1/161 |
| 9,612,123 B1 * | 4/2017 | Levinson | G01C 21/3635 |
| 9,672,446 B1 * | 6/2017 | Vallespi-Gonzalez | G06V 10/751 |
| 10,459,444 B1 * | 10/2019 | Kentley-Klay | G05D 1/0221 |
| 10,902,263 B1 * | 1/2021 | Angel | A61H 3/061 |
| 11,613,261 B2 * | 3/2023 | Raichelgauz | G06N 20/00 340/576 |
| 2008/0219505 A1 * | 9/2008 | Morimitsu | G06K 9/00201 382/103 |

(Continued)

*Primary Examiner* — Mohamed Abdo Algehaim

(57) ABSTRACT

An artificial intelligence system is enabled for an autonomous vehicle to calculate a plurality of trajectory paths. The system is enabled to identify and recognize objects. The autonomous vehicle is enabled using a convolutional neural network to determine various paths associated with the autonomous vehicle and also of other moveable objects in the environment. The autonomous vehicle is further enabled to use a cloud based server or edge computing device to pre calculate environments including predictions of environments. Upon an threshold of paths available an aggressive driving move may be authorized to proceed by the autonomous vehicle. The system is enabled to identify and recognize objects using a plurality of sensors including vision-based sensors, image sensors, video sensors, camera sensors, LIDAR, and sensor fusion. Data from various sensors may be combined and fused together to provide enhanced input to the autonomous vehicle.

20 Claims, 10 Drawing Sheets

Vehicle Movement and Prediction Modules

(56) References Cited

U.S. PATENT DOCUMENTS

| | | | | |
|---|---|---|---|---|
| 2012/0059789 | A1* | 3/2012 | Sakai | G08G 1/161 706/52 |
| 2013/0054128 | A1* | 2/2013 | Moshchuk | B60W 10/20 701/301 |
| 2013/0231824 | A1* | 9/2013 | Wilson | G05D 1/0246 701/26 |
| 2014/0136414 | A1* | 5/2014 | Abhyanker | G05D 1/0011 701/25 |
| 2015/0292894 | A1* | 10/2015 | Goddard | G01C 21/3453 701/400 |
| 2016/0019429 | A1* | 1/2016 | Ishigaki | G06F 16/583 348/47 |
| 2016/0176397 | A1* | 6/2016 | Prokhorov | B60W 30/09 701/25 |
| 2016/0176398 | A1* | 6/2016 | Prokhorov | B60W 30/09 701/23 |
| 2016/0339910 | A1* | 11/2016 | Jonasson | G05D 1/0061 |
| 2017/0057497 | A1* | 3/2017 | Laur | G06V 20/58 |
| 2017/0123419 | A1* | 5/2017 | Levinson | G06Q 10/00 |
| 2017/0132334 | A1* | 5/2017 | Levinson | G01S 17/931 |
| 2017/0221283 | A1* | 8/2017 | Pal | H04W 4/029 |
| 2017/0357263 | A1* | 12/2017 | Glatfelter | G05D 1/0212 |
| 2018/0046192 | A1* | 2/2018 | Keller | G08G 1/167 |
| 2018/0082587 | A1* | 3/2018 | Wan | B60W 50/14 |
| 2018/0233047 | A1* | 8/2018 | Mandeville-Clarke | B62D 15/0255 |
| 2018/0239361 | A1* | 8/2018 | Micks | G05D 1/0246 |
| 2018/0267147 | A1* | 9/2018 | Choi | G02B 26/10 |
| 2018/0286248 | A1* | 10/2018 | Choi | G08G 1/166 |
| 2018/0322348 | A1* | 11/2018 | Sweet, III | G01S 7/497 |
| 2018/0330615 | A1* | 11/2018 | Yamanaka | G08G 1/16 |
| 2018/0341822 | A1* | 11/2018 | Hovis | G06K 9/00825 |
| 2018/0357772 | A1* | 12/2018 | Takemura | G06K 9/00805 |
| 2019/0019413 | A1* | 1/2019 | Yun | B62D 15/0265 |
| 2019/0042859 | A1* | 2/2019 | Schubert | G05D 1/0221 |
| 2019/0072973 | A1* | 3/2019 | Sun | G05D 1/0221 |
| 2019/0096256 | A1* | 3/2019 | Rowell | G06T 7/248 |
| 2019/0152490 | A1* | 5/2019 | Lan | G05D 1/0088 |
| 2019/0196464 | A1* | 6/2019 | Lockwood | G05D 1/0016 |
| 2019/0236955 | A1* | 8/2019 | Hu | G08G 1/161 |
| 2019/0250626 | A1* | 8/2019 | Ghafarianzadeh | B60K 31/0008 |
| 2019/0263393 | A1* | 8/2019 | Han | G05D 1/0055 |
| 2019/0277643 | A1* | 9/2019 | Szubbocsev | G05D 1/0088 |
| 2019/0291723 | A1* | 9/2019 | Srivatsa | G05D 1/0221 |
| 2019/0310654 | A1* | 10/2019 | Halder | G05D 1/0088 |
| 2019/0317499 | A1* | 10/2019 | Imai | G05D 1/0088 |
| 2019/0355257 | A1* | 11/2019 | Caldwell | G08G 1/166 |
| 2019/0361439 | A1* | 11/2019 | Zeng | G06V 20/56 |
| 2019/0367021 | A1* | 12/2019 | Zhao | B60W 60/0011 |
| 2019/0367022 | A1* | 12/2019 | Zhao | B60W 30/18154 |
| 2019/0378423 | A1* | 12/2019 | Bachrach | H04L 67/52 |
| 2019/0383945 | A1* | 12/2019 | Wang | G01S 7/4861 |
| 2020/0004259 | A1* | 1/2020 | Gulino | G05D 1/0221 |
| 2020/0064483 | A1* | 2/2020 | Li | G01S 13/867 |
| 2020/0086854 | A1* | 3/2020 | Liu | B60W 30/0956 |
| 2020/0116515 | A1* | 4/2020 | Chadha | G01C 21/3453 |
| 2020/0159225 | A1* | 5/2020 | Zeng | G01C 21/3453 |
| 2020/0183394 | A1* | 6/2020 | Lockwood | G06N 7/00 |
| 2021/0086795 | A1* | 3/2021 | Zhao | G08G 1/0133 |

\* cited by examiner

AI & Object Classification Systems

State Machine on Moveable Objects

| Vehicle | Attributes |
|---|---|
| Vehicle A | Make, Model, Color, Tires, Speed, Weight, ability to harm vehicle |
| Vehicle B: Motorcycle | Variance high |
| Object 1: Horse | Slow moving |
| Object 2: Person | Variance score high |
| Object 3: Stoplight | Variance none |
| Object 4: Parked Vehicle | Variance low |
| Object 5: Parked vehicle with white lights on | Likely to move backwords, in reverse, defer to the car |

FIG. 3

Calculate Trajectories and Paths of Identified Objects

Calculating a Plurality of Trajectories of Objects.

Characteristics of Paths

- Speed
- Pitch
- Human Driven or Autonomous
- Acceleration

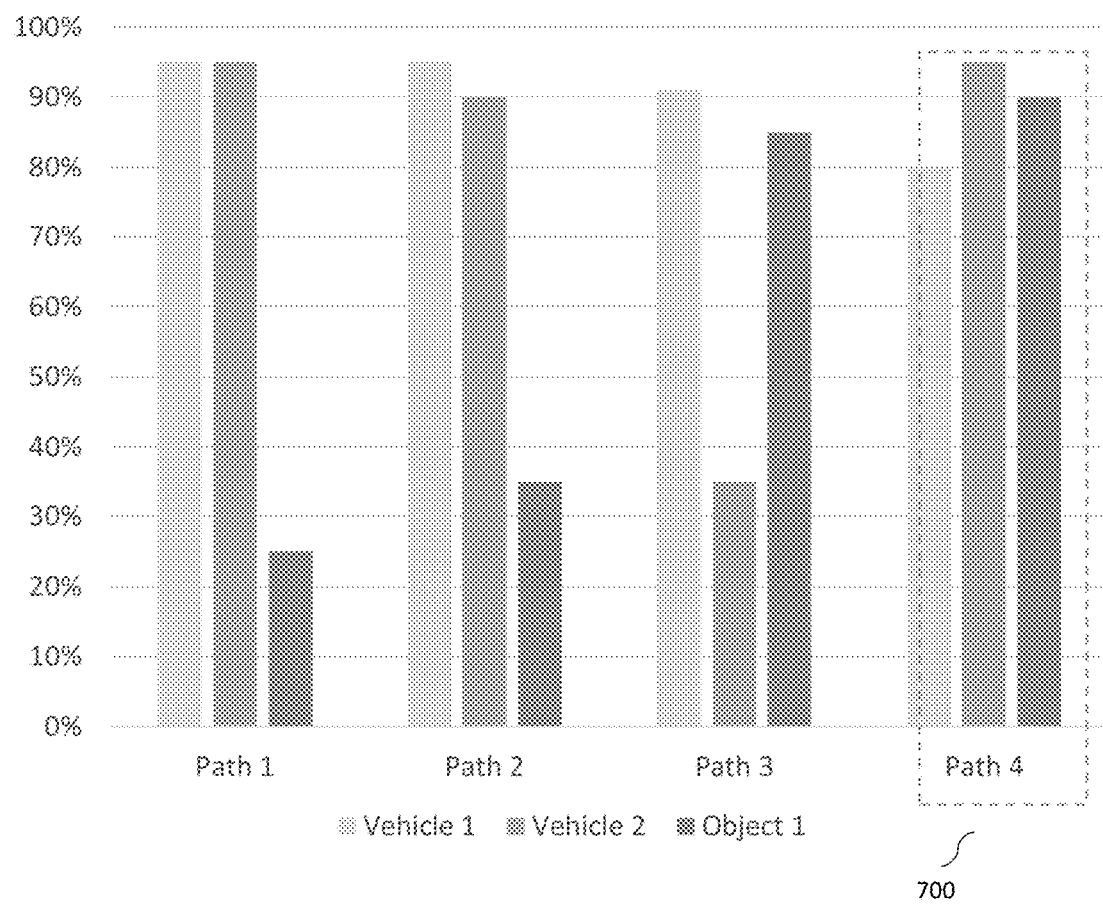
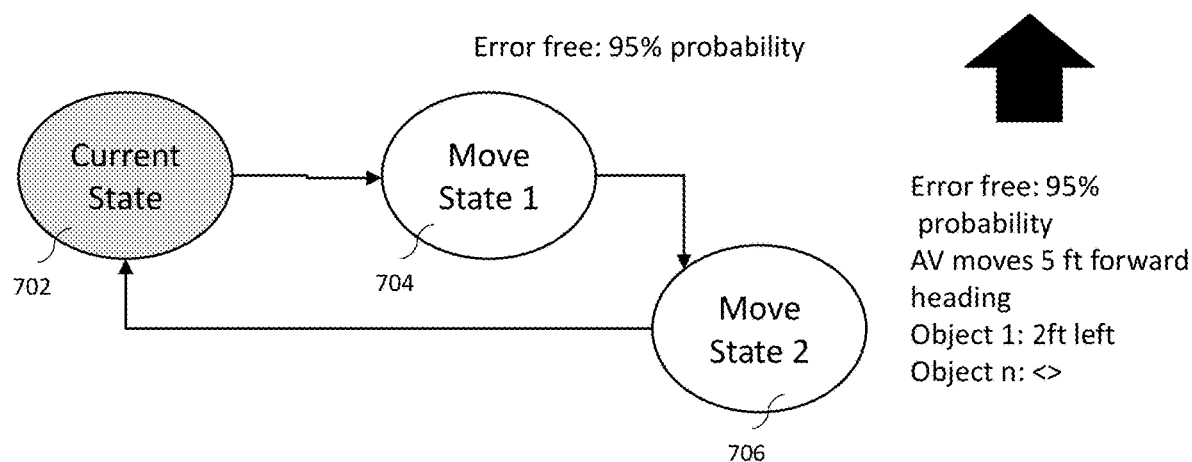
FIG. 7

Predictions of Objects Based on AI Training & Recognition

Pre-Cal Sets

Already Learned

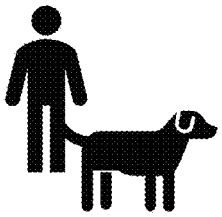

1000

- Object movement – example total space consumed by person (object 1) and dog off leash (object 2)
- Objects: Normal responsive to situation for a person
- AV: No change to scoring for person. Score dog as lower priority than human. Avoid a proximity distance to dog off leash. Change scoring if dog on leash.

- Person movement recognized as older person or disabled
- Object: Less responsive to situation slower pace
- AV: Reduce speed of vehicle below even speed limits.
- AV: Score environment as more complex.

- Two individuals include one child
- Object: link of hand between individuals, child may be unpredictable
- AV: Reduce speed of vehicle
- AV: Dedicate a camera to capture movement of child
- Prioritize in processor flow data acquired from camera fixed on child and couple movement.

New Learning

1002

- Four individuals, eyes are not looking up. Audio signal detect conversations. Distracted state of group.
- Object: Four individuals, distracted state
- AV: Reduce speed of vehicle
- AV: Dedicate microphone array to detect conversation and orient speaker configuration to provide warning to group if their approach is too close.

FIG. 10

AUTONOMOUS VEHICLE, MOTION, AND OBJECT PREDICTABILITY SYSTEM

CROSS-REFERENCE TO RELATED APPLICATIONS

The present application claims the priority benefit of U.S. Provisional Application U.S. 62/774,129 filed on Nov. 30, 2018; the present application incorporates by reference in its entirety U.S. Provisional Application U.S. 62/774,129.

BACKGROUND

The technical field herein relates to artificial intelligence, autonomous vehicles and driving systems.

SUMMARY

The disclosure as a whole should be considered to appropriately identify the scope and aspects of the elements of this disclosure.

It is an aspect of the present disclosure to enable for an autonomous vehicle to mimic human driving behavior including behaviors of aggressive driving such as lane passes, and intent based driving such as lurching.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

FIG. 3 depicts a set of attributes of the autonomous vehicle.

FIG. 7 depicts a distribution of various paths of objects.

FIG. 10 depicts various learned identification objects coupled to motion planning.

DETAILED DESCRIPTION

Figure 1:
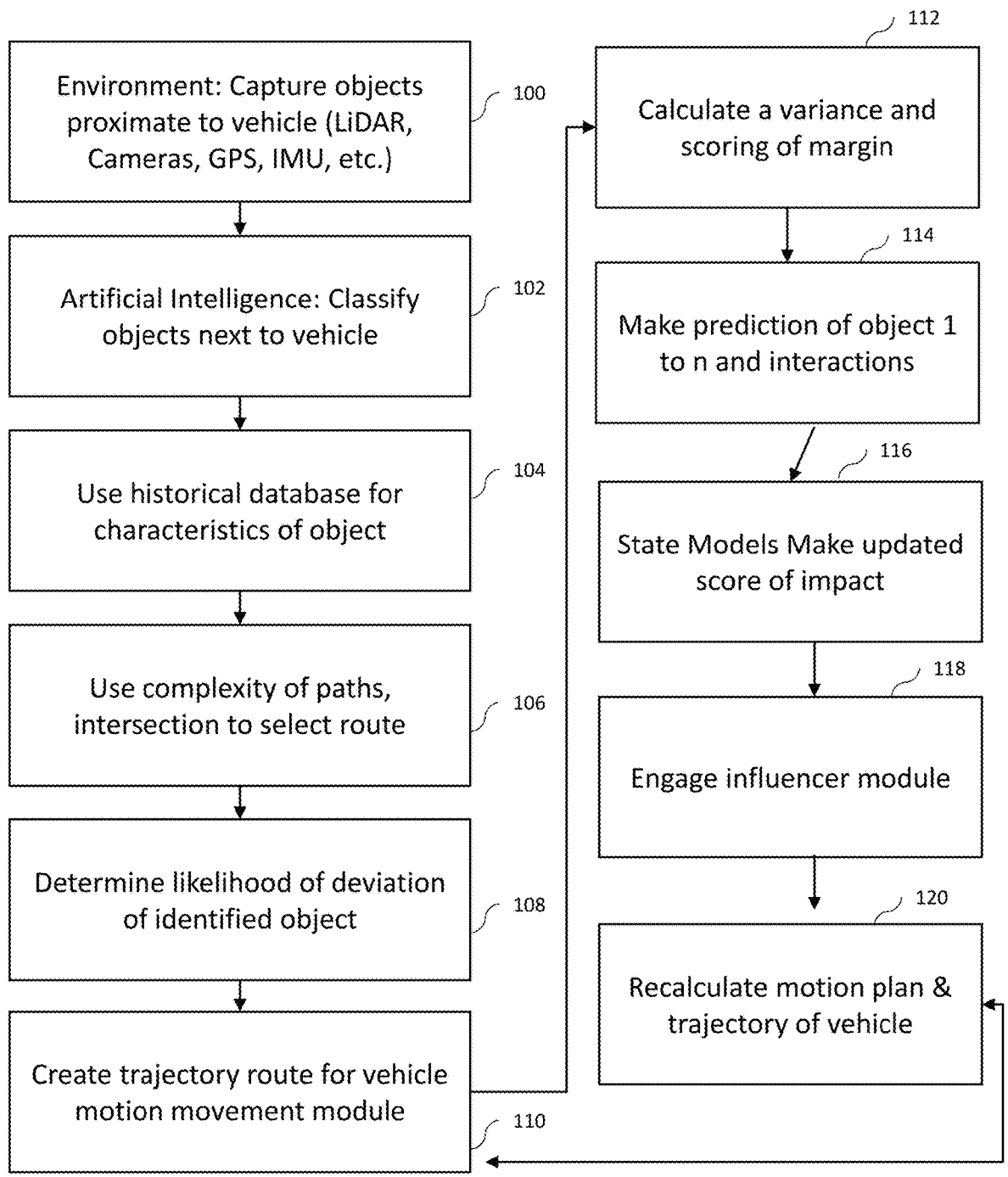
FIG. 1 depicts a plurality of modules which determine a trajectory of a first vehicle and a prediction of proximate objects.

Accordingly, a motion planning system of the autonomous vehicle is enabled to account for high degrees of variation in the moveable object. That is, beyond determining the path for the autonomous vehicle and the recognized moveable object, the autonomous vehicle is further enabled to create a greater distance from the moveable objects if those moveable objects exhibit variations in behavior that are not consistent with a prediction made by the AV. This afore mentioned behavior may be mapped to a defensive or less conservative versus aggressive driving stance. Further, it is an aspect of the present disclosure, to enable multi object modeling approaches that comprise of modeling motion behaviors of the autonomous vehicle and behaviors of multiple objects nearby to the vehicle.

The motion planning system described herein provides for motion planning for the autonomous vehicle. In addition, it provides for motion planning of related objects and vehicles. These motion planning routines are iterative so as to provide continual updates on vehicle changes.

It is an aspect of the present disclosure to enable an autonomous vehicle (AV) or an AV assistance system in a human driven vehicle to recognize a plurality of objects on a roadway and predict the likely movement of these objects. A deviant behavior of a moveable object, such as a car in proximity to the autonomous vehicle, may be a movement which includes variations from the most likely set of paths calculated by the autonomous vehicle. As an example, a moveable object that is heading north on a roadway that see saws left and right or east and west would be an example of deviant behavior. Accordingly, the AV is enabled to increase a distance between the moveable object upon detection of such deviant behavior.

Various programming languages such as Java, Javascript, C, C++, Python, R, Lisp, Schema, may be used to write instructions for execution by one or more processors. The written executable instructions may be stored in a non-transitory computer readable medium. Various memory systems may be built into the autonomous vehicle including RAM, SSD, cache, and other hard disk systems. These systems may be integrated into the autonomous vehicle.

In some embodiments a set of processors, a dedicated processor, and/or a cloud based system can be used to calculate a plurality of trajectory routes of the autonomous vehicle and a nearby vehicle or object. In certain instances, a software set of rules and decision engines may be enabled for implementation in a processor, module, GPU, CPU, custom ASIC, FPGA, custom AI based processors, and a combination of these processing units.

It is intended that the present disclosure further encompasses semi-autonomous and various levels (L1-L5) of autonomy of vehicles including fully autonomous situations. This disclosure is further intended to cover a variety of autonomous and semi-autonomous vehicles including cars, trucks, vans, scooters, electric scooters, bikes, pods, trains, flying cars, Vertical Take Off and Landing (VTOL) vehicles, airplanes, drones, blimps, and other moveable devices. These devices may include ride sharing vehicles and small mobility systems.

In some embodiments, a probabilistic outcome is determined for the autonomous vehicle and for a plurality of recognized objects by the autonomous vehicle. In these instances, a probabilistic state for how a plurality of objects will move and end up in a different time period can be determined. A state machine may be created or a finite state machine (FSM) may be created. In the state machine, for example, an object can be classified as moveable or not moveable, moving forward, moving laterally, and/or moving backward. Additional states may be added dynamically to the state machine. As an example, a state such as deviant behavior or aggressive behavior may be added.

In some embodiments, for each object a distribution of various trajectories can be made. These can be made based on a plurality of Monte Carlo simulations, decision trees, and scenario analysis. A plurality of probabilistic outcomes can be created including the various trajectories of objects. In each scenario a probability associated with each object moving can be varied within a variance threshold. This scenario can be run a plurality of times to generate a conflict free collision avoidance path through various objects.

In certain embodiments, the calculation of these predictions must be done in a continuous and real time based on the complexity of the environment. A processing system may prioritize which objects the processing system should use to calculate trajectory routes. The prioritization may further be critical when the processing resources of the AV are limited and the information is high. As an example, objects identified as stationary including for example a tree, a stop sign, a lamp post can be identified as stationary and no predictive routes associated with these objects may be calculated. But in other cases, objects that are enabled to move are sent to the processor module for a determination of a predicted route of the moving object. The processor module is enabled to determine a plurality of routes for the moving object such as a most likely route, a least likely, a probable route, a problematic route, and a catastrophic route. Each path may be labeled with a percent likelihood of occurring. These various pre-calculated devices may be stored in a memory and/or database.

The paths, trajectories, and movement approaches of these moving objects can inform the movement approach of the autonomous vehicle. That is the AV may continuously or periodically calculate a movement path to navigate an environment without impeding the path of moving objects, avoiding contact with the other objects, and accomplishing the AV's proximate and ultimate movement goals.

In various aspects, determining how the AV should respond to vehicles and objects may need to be processed in real time. In certain instances, the frequency of the processing of responses and perception of an environment and related objects may be configurable based on settings of the AV. That is the AV may process an increased number of paths from each of the objects in the environment should the processing resources be available and a more complex operation is needed for the AV to pursue including navigating an environment.

In some instances, an AI processing module may further identify various movements of objects without the need to see multiple frames over time. As an example, the AI system may be taught to recognize a split leg in front of another leg as a person walking versus standing stationary. This may be based on a plurality of images in a training data set that shows a first image of a split leg and a second image of a split leg involving a position change of the person and another person's leg moving forward. Thus, the AI system can predict when a person is moving and the trajectory of the person. Similarly, a biker or a vehicle can be analyzed to understand its movement characteristics based on a plurality of images. The AI system may learn that a human looking at a phone in their hands may be in a distracted state. These perception and understanding systems can inform the predicted path of the objects taking and the risk factors associated with the objects. In those instances, wherein a distracted state of one or more individuals is identified, the AV may increase its processing and motion planning of various objects in the environment.

Predictability of other vehicles and individuals may also be based on a calculation of a reliability/variance score of the object to act in a predictable fashion. The reliability/variance score can include a determination for aspects including answers to questions such as how likely is a motorcycle, for example, to deviate from a route, how erratic is the car progressing first before ultimately making a change in direction, or what is an uncertainty score of an individual to move in an a fashion that is different from the most likely path. Behavioral indicators may be used. Past driving behavior may be used. A database or a cloud based storage system of objects and behavior of previously recorded maneuvers may be utilized. As an example, the AV may calculate that an oncoming car will proceed in a linear path with a 90% probability and a 5% probability that it will turn right at the nearest stop sign based on a past behavior of similar vehicles. Further, it may be based on the speed at which the on coming car is proceeding and the ability for the car to slow in a reasonable fashion to make a turn to the right. The AV may also further model a confidence interval associated with this prediction.

Motion Planning & Movement Paths

In select embodiments, how the vehicle responds may be configurable based on a prediction perception module to enable for less or more aggressive driving situations. A threshold of risk of a break in the path, that is a movement path which results in the AV stopping in a position, may be provided. In such a situation the following of a path to a next set of actions may result in the autonomous vehicle stopping and letting a vehicle pass that should not have passed. A setting may be configurable for the autonomous vehicle that states an acceptability to have a broken path associated with the autonomous vehicle. A broken path is when the autonomous vehicle is proceeding along a particular trajectory but either has to stop or move to another trajectory as a result of some other action occurring.

Predicted Paths of Nearby Objects with Variance Assessments

The determination of how one vehicle operates may be aided by understanding how a second vehicle operates, how a third object responds, or how an importance score associated with a vehicle, object, or device. Each device or object may have observed capabilities and susceptibility to harm. For example, a truck may have significant defenses relative to a smaller car or relative to a curb or street corner. A person may have a plurality of rating factors such as high susceptibility to harm, intelligent rating, low movement capability, communication capability with an identified smart watch, wearable device, or more mobile phone. These objects may be scored based on a configurable set of parameters. The scores my ultimately be fed into an algorithm described in a non transitory computer readable medium including instructions for execution by one or more processors of an autonomous vehicle and/or a cloud based server system to deliver a preferred path of the autonomous vehicle to pursue.

The embodiments contained herein move beyond only calculating a score of objects, planned trajectories of objects and a path of the autonomous vehicle. The variability of each object may be calculated as a continuous sequence thereby providing discrete or periodic updates to the autonomous vehicle. As an example, if a car exhibits behavior of see-sawing by moving left and right while continuing generally in a straight motion path rating the car may have a higher unpredictability rating. The probability of path associated with that car to move left and the path associated with the car to move right may still remain the same. However, the variance associated a trajectory change may be different upon identification of the see saw behavior In some embodiments, the path the AV takes may be customized based on the types of vehicles encountered and the risks those vehicles could pose to the AV. As an example, if the AV encounters a larger SUV and the autonomous vehicle is a smaller vehicle the susceptibility of harm to the autonomous vehicle from the SUV may be higher. Thus, the autonomous vehicle may delay taking an aggressive motion path and avoid passing the vehicle. In an alternate case, where the identified car is exhibiting a consistent behavior over a time period, and the autonomous vehicle wishes to pass the vehicle at a faster pace, then this desire is enabled to be approved for execution and a score for a move forward will be accepted.

In various instances, there is further a need for autonomous safety systems and that report rider safety, passenger safety, driver safety, nearby vehicle safety, and so forth.

Object Detection

Objects may include for example, people, cars, animals, bikers, lanes, signs, roadway paths, billboards, and obstructions.

A plurality of cameras may classify a plurality of objects on a roadway of a certain type. For example, an image of biker may be classified using a neural network and image and object recognition systems. A movement associated with the biker may also link it to a motion rating by an object motion module (OMM). The OMM may predict a set of paths on a periodic basis for the object. As an example, the biker may continue straight, veer left, veer right, halt in position, or proceed at a faster or slower rate. While this trajectory approach may give a probably associated with the various paths, the autonomous vehicle can determine its path so as to avoid the vehicle.

Beyond the trajectory mapping a predictability module of the OMM can calculate by one or more processors a variability rating associated with the object. This variability rating may calculate the variability rating by looking at a variance of historical activities associated between a predicted and actual trajectory path. That is beyond determining a probability associated with each path of an object trajectory, a variance may be calculated. This variability factor can be correlated with the type of object and other object specific factors to determine a score of distance.

As an example, an autonomous vehicle that is driving next to a nearby human driven car may determine a set of x paths for the autonomous vehicle including a minimum viable path and a safety path. In addition it may determine a set of y paths for the nearby human driven car. Accordingly, the AV may proceed in a fashion so as to avoid the y paths of the nearby human driven car. However, the OMM may further determine based on historical and observed parameters of the biker an erratic movement path. That is the erratic movement associated and variance associated with the biker movement may further be calculated. If this erratic score falls above a certain threshold, then it can be determined that the AV should take a different path, such as a more conservative path that involves extra object avoidance.

In another embodiment, an object may be classified as a moveable object, a person object, and a specific type of object. As an example, a street lamp is classified as a fixed position object and inanimate object. These objects may be a pedestrian, bicycle, car, truck, with specific make, model, and color. Each object may be scored along a predictability score to follow the traffic rules. This information may be stored locally or in a cloud based system.

It is an aspect of the present disclosure to enable the autonomous vehicle or a driver assistance module to dynamically respond to a second object or vehicle or be guided on its response to the second object or vehicle based on a prediction of the likelihood of the second device being a reasonable or based on a predictable actor model.

It is an aspect of the system to enable vehicles to communicate with each other in a vehicle to vehicle communication system using one or more networking and wireless networking including millimeter wave length, light based systems, wifi, cellular, Bluetooth, and other wireless network systems.

A computer vision system may be included as part of the autonomous vehicle. It is further an aspect to enable vehicles with various cameras including digital video and digital 360 video and digital cameras. The vehicle may be enabled with one or more processors, specialized embedded processors, camera processors, AI processors, and other devices. The computer vision service may be implemented in a dedicated processor or accessible using a cloud based service or implemented as a software application stored in a non-transitory computer readable medium. The computer vision service may be accessed via a plurality of Application Programming Interfaces (API).

These sensory devices may be enabled for contour detection, people detection, object detection. Cameras may be enabled to recognize people. Multiple cameras can be used together each with a different perspective. A convolution neural network (CNN) can be used in conjunction with training data that identifies signs, road markings, dividers, turn signals and various aspects of a road.

The convolutional neural network (CNN) may be created dynamically by the autonomous vehicle. A cloud based system may further be enabled to calculate environments in advance of the autonomous vehicle entering the environment. That is the cloud may create various predictions at time periods away from the autonomous vehicle. At the same time the autonomous vehicle may create a CNNs based on the environment. Thus, the processing power of remote systems may be enabled.

In addition, a look ahead vehicle may provide its processed environment maps to a neighboring car. In these instances, the object identification, recognition, scoring, cost functions, and other factors of neighboring vehicles can be leveraged by the autonomous vehicle to reduce processing time. Various cost functions of movements in an environment may be calculated. These cost functions associated with movement paths may be scored and the processor of the AV may be enabled to select the movement path that has the lowest cost function and also the lowest various across a plurality of simulations. Further these cost functions may encompass the environment calculations by the AV or by a local cloud server.

Under these instances, an aggressive driving move by an autonomous vehicle may be enabled.

In another instance, the aggressive driving movement may be enabled by lurching system. In these instances, the AV may be enabled to exhibit its move based on slight jawing left or right or lurching forward in advance of the aggressive move to indicate to other vehicles and drivers including human driven drivers of its intended movement path.

Trajectories Including Fast, Heading, Transmitted to Nearby Vehicles and Cloud Servers A plurality of trajectories, speeds, acceleration, and headings may be calculated for the AV and objects nearby to the AV.

These cameras can capture a plurality of objects, identify the objects, classify them into one or more categories, determine a trajectory of the objects, determine a plurality of trajectories of the objects, create a plurality of paths for the autonomous vehicle, and identify the appropriate path to proceed on based on a maximization of one or more criteria that avoids contact with any of the objects.

The prediction module may further attempt to include a predicted behavior of an object, influence the other object to create a new trajectory for the other object, and recalculate an updated prediction. An influencer module may be implemented in software for execution by one or more processors. The influencer module may be within the AV or be a cloud based influencer module accessible by one or more servers. The influencer module may further be enabled to influence a second object that is intelligent or also influence an object that is not intelligent. The AV influencing another object may involve wireless communication with a second object. In certain instances, a separate object may be enabled for intelligent communication such as that of a second AV. In this instance, the trajectory between the AV and the second AV, a third AV, or a n-th AV may be communicated between the vehicles.

In other instances, the influencer module may attempt to influence non-connected wireless connected objects. The influencer module may also communicate to various proximate wireless devices. As an example, a human that is on a roadway and has a mobile device may receive via an application an description of a driving event from the AV and an instruction as to how to avoid the AV. The mobile device may listen on a certain set of frequencies including a Bluetooth, cellular, or millimeter wave length frequency for one or more broadcast or directed messages.

Real Time Computation with Pre-Calculated Events and Object Profiles

In an autonomous self-driving vehicle, the need to make continuous decisions about the path may be necessary in complex environments where there are multiple moving objects, few available paths, crowded spaces, or a high degree of safety needed. In these environments, decision making engines may need to determine the appropriate path of a self driving vehicle within milliseconds or a few seconds. The computing system for this may be enabled by having a plurality of processors configured to execute parts of paths continuously. The most critical path may be assigned to a processor network that completes the task the quickest. The lower probability paths may be assigned to a set of other processors. These route maps may be pre-calculated and only differences associated with objects changing The assignment of the workload may also be based on a time to a destination. The processors may create a set of states of the localized environment based on a plurality of paths. As an example a car driving on the right side of the vehicle may continue to be on the right side of the vehicle and ahead of the AV at a distance that is based on the speed of this nearby vehicle and the AV. In this state the calculation of the state of the environment for a time equals 0 can be calculated but further the state of the environment at a time equals 1, 2, 3, 4, 5, and so forth may also be calculated.

In order to quickly determine paths, once a model of these states at various times has been calculated, the processors may compare any changes of the current environment relative to this model that has been created. This enables the computing resources aboard the car or a cloud connected service to more quickly determine the appropriate path of the AV.

Vehicle to vehicle communication may be enabled using cellular, WiFi, Bluetooth, and millimeter wave length.

Minimum Safety Point versus Maximize Goal

In a preferred embodiment, the autonomous vehicle is enabled to store in memory and calculate via one or more processors a minimum safety point and a minimum safety path. In such cases, the minimum safety point is a location that the vehicle can move to or stay in to avoid hitting another object or being hit by another object. A minimum safety path may include an egress off a roadway to a shoulder to avoid being hit by another vehicle or object.

In some embodiments, the autonomous vehicle is further enabled to store in a memory and calculate via one or more processors, a plurality of maximization paths. As an example, a maximization path may include, for example, a path that includes moving more aggressively in an environment while still avoiding a collision from any neighboring vehicles.

As an example, the autonomous vehicle may recognize objects in a certain field of view of one or more cameras. The autonomous vehicle may also take the perspective view of a nearby vehicle and use its acquired data to perceive how the nearby vehicle is viewing the environment from its perspective. The AV may then simulate the behavior of the nearby vehicle. If there is a mismatch between an object identification or a likely trajectory path of the AV and the nearby vehicle, a mismatch score can be calculated and the AV may increase the distance between it and the nearby vehicle. Alternatively, a probability of a collision occurring may be increased, resulting in a movement by the AV to avoid the collision.

Referring now to FIG. 1, FIG. 1 depicts various modules within a vehicle avoidance and safety mechanism. The AV is enabled to capture a plurality of objects using one or more sensors and acquisition devices 100. These devices may include LiDAR, Cameras, Thermal imaging, inertial measurement units (IMU), wireless IMU, gyroscope, accelerometer, barometric measurement, altitude, satellite communication, GLONASS, GPS, and location based information or a plurality of other sensors. Using one or more processors aboard the vehicle, a composite object is identified 102. An onboard database of historical mappings between object and characteristics is accessed.

One or more processors are enabled to classify various objects 102 based on one or more neural networks, machine learning APIs, classifications, and profiles. Each object may be coupled with a rich profile regarding the object. A historical database 104 may be available in one or more memories accessible by the one or more processors of the autonomous vehicle.

One or more processors of the autonomous vehicle or on a cloud based server system are enabled to determine a complexity of navigation route. A plurality of configurable parameters may be characteristics of a complex path. As an example, the types of vehicles on the road may increase a score for a complexity path. The speed of the roads may further be associated with the complexity path. Higher speed roads may typically be configured with a higher complexity score. However, higher speed roads that are rating as linear like freeways without heavy traffic may reduce a complexity score. A rating of the number of intersections including types of intersections such as round-about, stop signs, unprotected left turn signals further contribute to a higher complexity score. These traffic ratings may be from a historical database as reported by other vehicles that have traversed these intersections. Each aspects may be associated with increased points. These points can be associated with categories such as route complexity, intersection complexity, vehicle complexity, and so forth. Each of these categories can be weighted. A predicted number of these complexities can be calculated or accessed based on a historical database of previous map readings.

Prior to and continuous on a route, an autonomous vehicle is enabled to detect one or more objects. This object detection may be by a computer vision interface and/or a neural network.

Each of these complexity scores may be normalized using a logistic or other function. As each path has a rating, the motion movement module 110 can then provide a direction for the autonomous vehicle to proceed. For each detected object and each path and roadway a margin of error comprising of a distance from each object may be calculated so as to provide a clear motion path for the autonomous vehicle to proceed through an environment. As an example, a street sign may have a desired margin of error distance comprising of 2 feet away from the vehicle. The movement though associated with the sign is placed at 0 feet with no variance from that position. This is because the sign is a fixed position object. The object detection system will have previously identified the object and determined various characteristics of it including the fact that the sign does not move. Therefore the vehicle can proceed up to the margin of error on its motion planned path.

Now in the situation wherein an object is detected and object identified and determined to be moveable and/or moving, the one or more processors of the autonomous vehicle or a cloud based processing system may determine a different margin of error distance, a predicted movement of the object, a variance associated with the movement of the object, and a motion path for the autonomous vehicle that provides a clear path that is enabled to maintain the margin of error distance by further predicting the movements of the identified object. As an example, in the case where a second vehicle such as a second car is identified as the object, the trajectory of the second car may be determined using a probabilistic prediction module. As the second car moves down the path, the autonomous vehicle can determine that a 3 foot margin of error distance is appropriate to maintain between the second car and AV. This may already be encompassed in how the lanes on a road provide distance. This margin of error is configurable over time.

Now, in a situation where an obstruction on the lane or trajectory of the second car is identified, such as a for example, a delivery vehicle pulled over on a right side of the road, the trajectory of the second car will likely involve moving slightly to the left so as to create an appropriate margin of error between the second car and the delivery vehicle. However, by the second car moving to the left the margin of error distance between the AV and the second car is likely to reduce. In certain situations, this may be appropriate such as no other vehicle or object and a non dangerous path on the left side of the AV. Correspondingly, even if part of the margin of error between the AV and second car is reduced by for example 1 to 2 feet, a critical warning and change will not occur. However, if the AV wants to maintain the distance, then the AV having seen the obstruction facing the second car and having predicted the movement left by the second car to avoid the delivery truck, may itself move to the left prior to or in concert with the second car moving to the left. That is the AV predicted an intended movement by the second car that deviates temporarily from its likely trajectory and appropriately took an action to maintain a distance between the vehicles. Alternatively, the AV may slow down or speed up so as to allow a margin of error to be available but also at a diagonal.

These calculations may be recursive and allow for a variety of scenario modeling to allow for margin of error distances to be maintained or used up at different levels. As an example, a maximization function may be enabled to provide a critical level of distance to be between the AV and the second car while maintaining a full margin of error between the AV and a biker or pedestrian. A margin of error may be associated with a plurality of priority levels such that under motion planning models the margin of error distance between certain objects is maintained at a higher distance than other objects.

A non predictive system may have only allowed the AV to respond to the second car responsive to the movement of the second car. The predictive system 114 of the AV is able to respond proactively by seeing objects of relevance to the second car and in turn understanding the relevance to the AV. The AV may be able to predict motion plans of objects. But how these objects impact a first detected object, a second detected object, and so forth and how those motion plans ultimately could impact the AV is also determined by one or more processors of the AV or a cloud based motion planning system.

The predictive system is enabled to do motion planning for a plurality of objects and their interactions. In these interactions, the result of margin of error distances can be calculated. In addition, a variety of trajectories for the various objects and the AV can further also be calculated. A maximization function can then use these models to predict motion paths. Various scores, state models, and scores may be recalculated iteratively 116.

The autonomous vehicle may further contain an influencer module 118 which may attempt to influence an environment. The influencer module of the environment may enable the autonomous vehicle to alert other object as to its presence. As an example, the AV may alert other vehicles by sound, light, messaging, and alerts to mobile devices. Alternatively or in addition, the AV may influence an environment by speed, trajectory, acceleration, velocity, and lane switching. As an example, if the AV detects a person on the right side of the street, the AV may switch to one lane over to provide additional space to the person. This would increase the margin of error distance. The motion plan and trajectory of the vehicle 120 may then be recalculated across a plurality of simulations.

Figure 2:
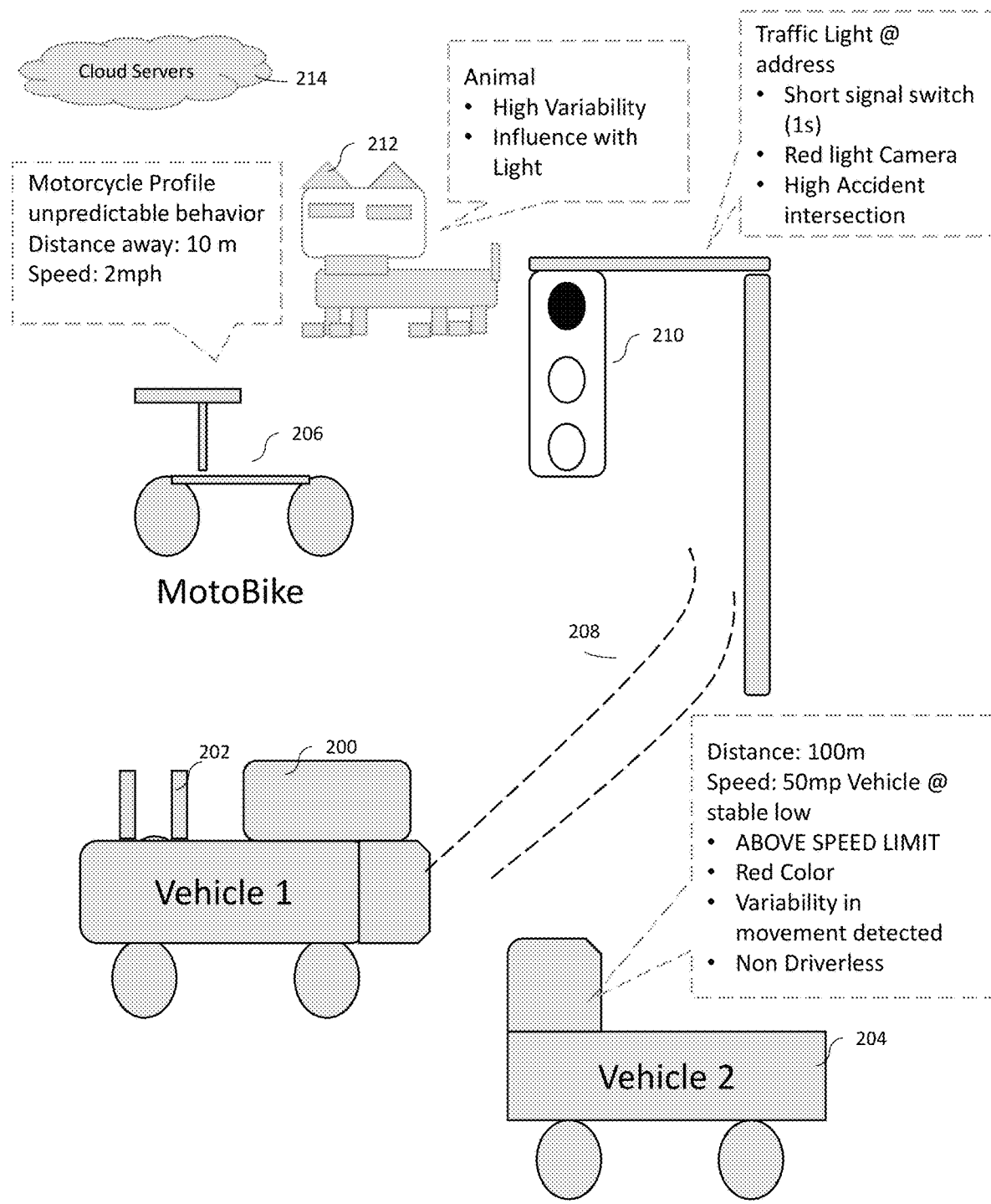
FIG. 2 depicts an object identification and classification system.

Referring now to FIG. 2, FIG. 2 depicts various objects in a driving environment and the identification of those vehicles and objects by one or more sensor and image acquisition devices of an autonomous vehicle 200. The autonomous vehicle may be enabled with a LiDAR system 202 and one or more cameras. Various other sensors, IMU and other environment acquisition devices may be accessible. The autonomous vehicle may capture from a LiDAR pattern the outline of a car, detect the object as a car based on a pattern recognition, movement recognition, pinpoint recognition, or image recognition. A camera or camera array or a plurality of cameras may be enabled to further image the vehicle to recognize aspects of the car. The camera may further identify make, model, and recognize the eyes of a driver of the vehicle 204. A vehicle to vehicle system may enable communication between the autonomous vehicle and the nearby vehicle 204.

Other objects such as a bicycle 206 may be captured using one or more of the environment sensors. This object may be linked to an accessible profile of the object. As an example, a bicycle may have a profile associated with not imposing a major threat to the autonomous vehicle, having a higher degree of variability from a set path such as when a biker falls off, and wherein the object has a low level of defense relative to the vehicle.

Still referring to FIG. 2, the autonomous vehicle may identify various lanes and road symbols 208. These lane markers may help the autonomous vehicle keep an appropriate distance from the markets and to follow trajectories. A stop light may be identified by the LiDAR system and the colors may be obtained further from one or more computer vision systems to identify green to go, yellow to slow, and red to stop. The specific traffic light may be linked with a location that is identified by the autonomous vehicle as being in a geofenced location proximate to the vehicle. These traffic lights may further have a specific profile associated with them and tied to an intersection. As an example, the traffic light may have a profile of having a red light camera, a short signal transition between one side turning and another traffic light, or being associated with a high accident area. These scoring factors can be fed into the vehicles motion planning system and path scoring system. High scores associated with routing paths through this intersection relative to other intersections can result in the autonomous vehicle selecting a different route. Alternatively, the autonomous vehicle may chose to stay in only the right versus the left lane during this intersection. A cloud based system 214 may be enabled to provide recommendations.

In other instances, animals 212 other moveable objects may be identified by the autonomous vehicle. Each of these objects may be classified by a neural network or recognition system to be in a certain category. In turn each of these categories may be affiliated with one or more behaviors. As an example, an animal may have a high variability and tendency to go on various different trajectories. The animal may also be influenced by light. The animal may be associated with a profile field that includes a fast movement or a slow speed.

Take as an example, a deer animal. In one embodiment, the influencer module of the autonomous vehicle may attempt to alter the behavior of non-connected wireless devices. As an example, if an autonomous vehicle identifies an animal such as a deer, the vehicle may determine that the deer is likely to move into a forest. If the forest appears on right side of the path, the AV may veer left so as to provide an predicted exit path for the animal. Under high intensity of light, deer and other animals may see too much light to be able to assess the AV coming at them. Alternatively, the AV that detects a deer and calculates that there are not other objects in a path can determine to decrease the intensity of the headlights or the direction of the headlights so as to avoid directly shining light in the deer. Alternatively, a different color of light such as red may be used so as to not impair the vision of the deer. In this instance, the AV can illuminate a path for a deer or object to exit away from the vehicle without blinding the object.

3D Mapping, Spatial Data, and Environment Understanding

In one embodiment, an autonomous vehicle is enabled to continuously map a 3D environment and develop spatial data regarding the environment around the vehicle. It is an aspect of the system to enable vehicles to be enabled with a plurality of environment acquisition devices including cameras, radar, Light Detection and Ranging (LIDAR), thermal imaging, acoustic imaging, proximity sensors, motion sensors, ambient light sensors, refractory sensors for depth perception of objects, and other sensors. A grid and pinpoint system may be developed that identifies various objects and their contours and shapes. By looking at movement over time, a trajectory for each of these objects may be created.

A LIDAR (LIDAR, lidar) system may be used in the vehicle. The Light Detection and Ranging system may use a series of light pulses from one or more lasers. These pulses can aid in detecting distance and object. The LiDAR system may further comprise of one or more receivers and scanners. The LiDAR system of the also be used in conjunction with a plurality of other devices including for example a Global Positioning System (GPS), cameras, infrared sensors, radar, thermal assessments. These sensor inputs may be processed by one or more processors onboard the vehicle and/or by a cloud based server.

The LiDAR system may include a positing of a spinning LiDAR on top of the vehicle. A series of LiDAR devices may positioned around the vehicle including a proximity to the front headlights, on top of the vehicle, in the back of the vehicle by the sides of the bumper, on top of the trunk. The LiDAR system may be housed in a self-contained unit. The LiDAR systems may also be placed on a tray on top of a vehicle.

A configuration module may be enabled to determine the LiDAR viewability zone across a plurality of field of views. A telephoto LiDAR system may be enabled to provide an object detection that is focused on a higher field of view to encompass objects further away.

A multichannel LiDAR device may further be enabled to capture inputs at different wavelengths. These sensor devices provide sensory data that enables the one or more processors to perform object detection.

A spatial audio system leverage one or more microphones including a microphone array may further identify objects based on their audio signatures. An AI system coupled with a training data system may be enabled to learn various sounds. The spatial audio system may further be enabled to detect where the vehicle is and where the vehicle is moving to. A series of filters may be enabled including low pass, band pass filters, noise cancellation to isolate vehicle or people sounds and determine their movement patterns.

Referring now to FIG. 3, FIG. 3 depicts a plurality of attributes of a vehicle and objects. A set of stored parameters and attributes may be saved relative to each of the objects. This data may be created by a shared network of vehicle users or stored in a cloud or local data storage place.

Figure 4:
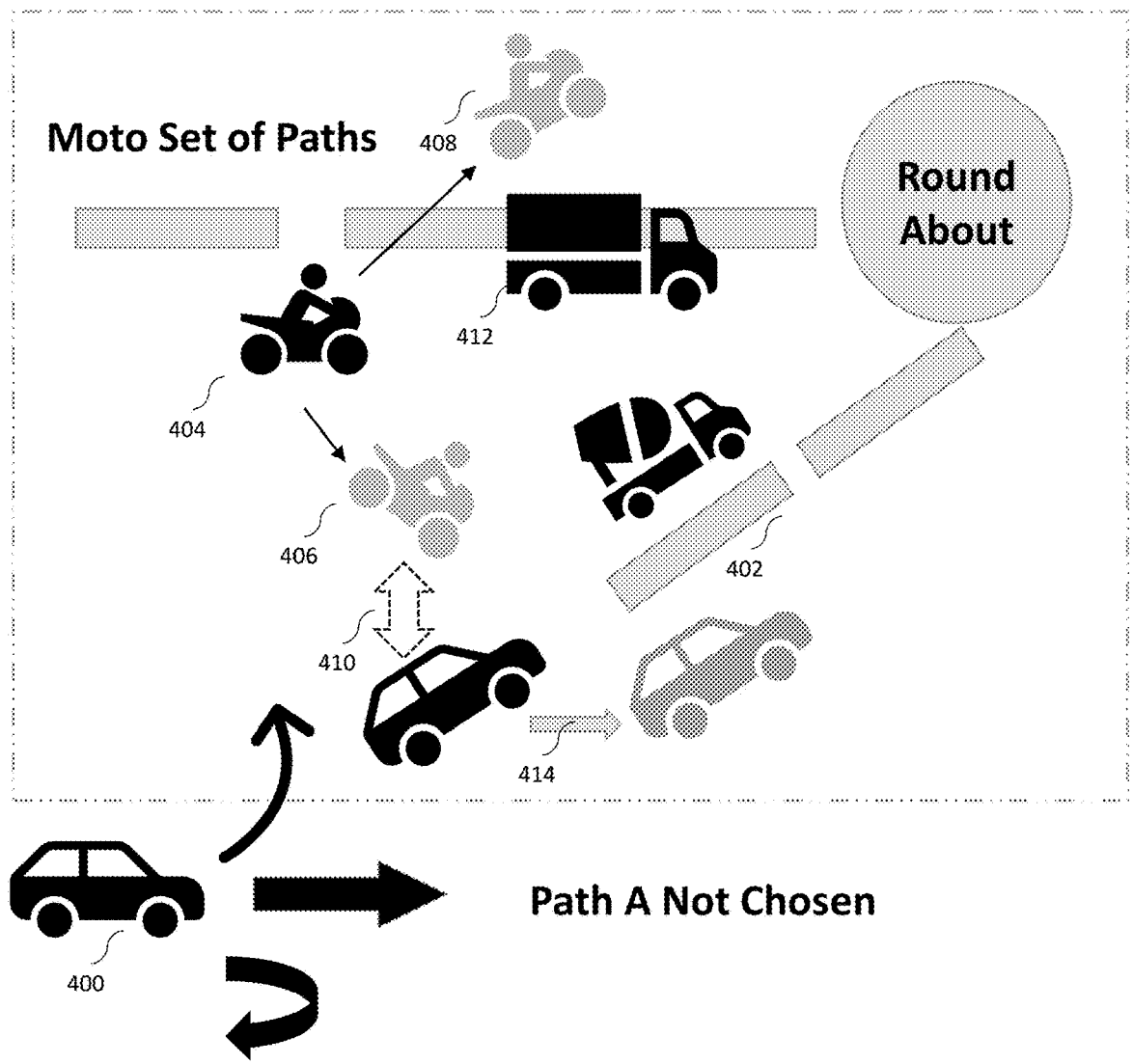
FIG. 4 depicts the detection of an object that has a high variance and a proclivity to take a number of different paths.

Referring now to FIG. 4, FIG. 4 depicts various motion paths of vehicles and objects in the Path B. The AV 400 may proceed along the Path B using lane markers for identification purposes 402. As the AV moves on this path it may capture an object including a motorcycle 404. The one or more processors on the autonomous vehicle may then generate a predictive path of the motorcycle that includes veering right 406 or veering left 408. If the motorcycle veers right then the distance and margin of error distance 410 between the AV and the motorcycle may dramatically reduce. The AV may further image and/or capture from LiDAR that a parked truck is in the path of the motorcycle. Since the AV is enabled to capture the obstruction in the path of the motorcycle. The AV is further enabled to predict various movements associated with the motorcycle. As a result the AV may proactively signal and move to a different path 414 that provides a greater margin of error distance between the AV and the motorcycle.

Figure 5:
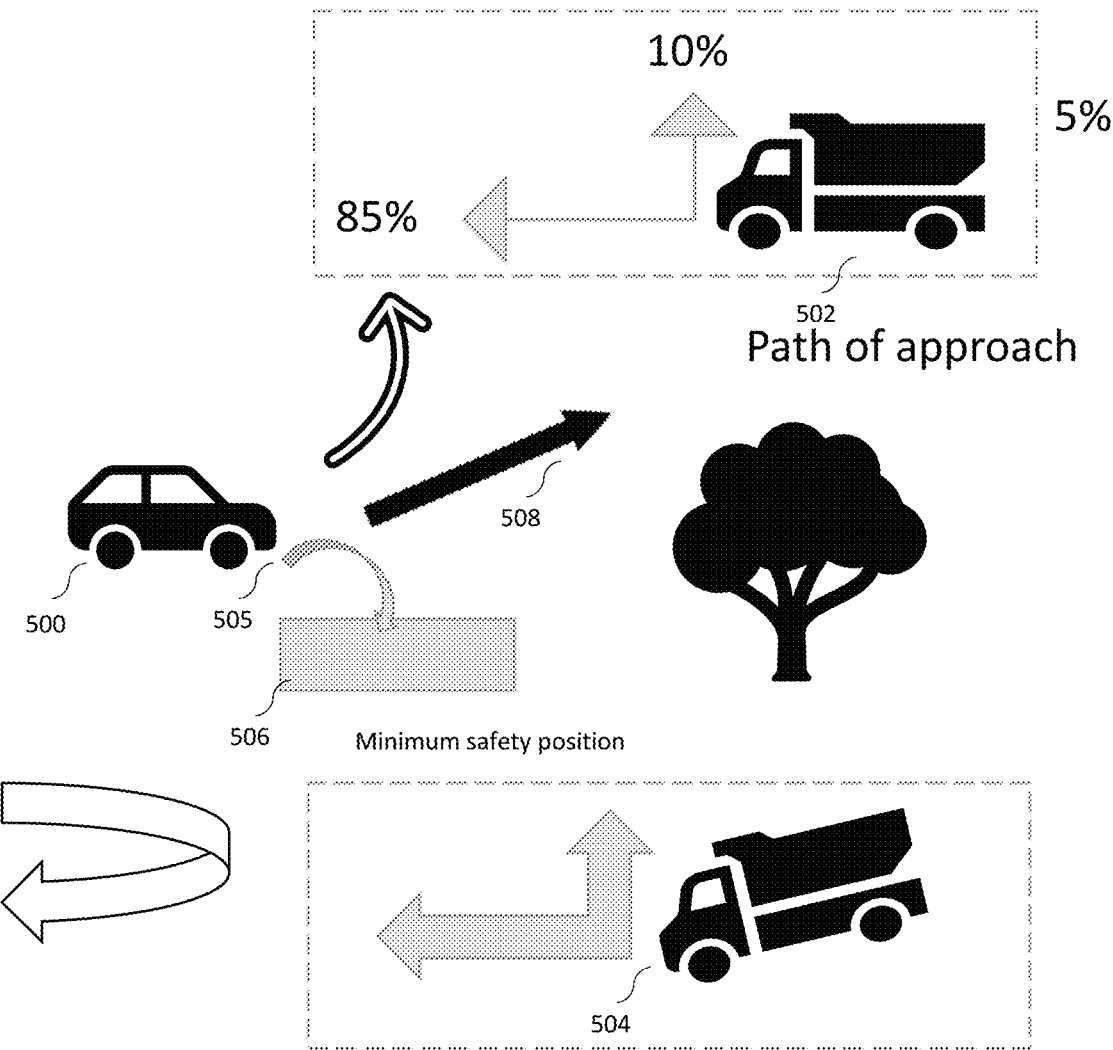
FIG. 5 depicts an autonomous vehicle calculating various predictive paths for a plurality of devices including itself and nearby vehicles.

Referring now to FIG. 5, FIG. 5 depicts the AV 500 calculating a safety position including a minimum safety position 506, a minimally optimized route 505 and a more optimized route. A minimum safety position may be a side position or it may include taking a reverse position. The minimum safety route may also further include changes to speed, trajectory, or acceleration. The AV may further calculate the path of approach of an on-coming vehicle 502. The path of the vehicle may be defined a probability movement model generated by the autonomous vehicle. The movement model may include a straight position with an associated probability, a side position with a different percentage and a uncharted position with a lower probability. Another on-coming vehicle 504 may also be associated with probabilistic movement model. In this instance the AV is not only modeling a safety distance from the nearby vehicle but also modeling various scenarios of how this vehicle may end up moving.

Figure 6:
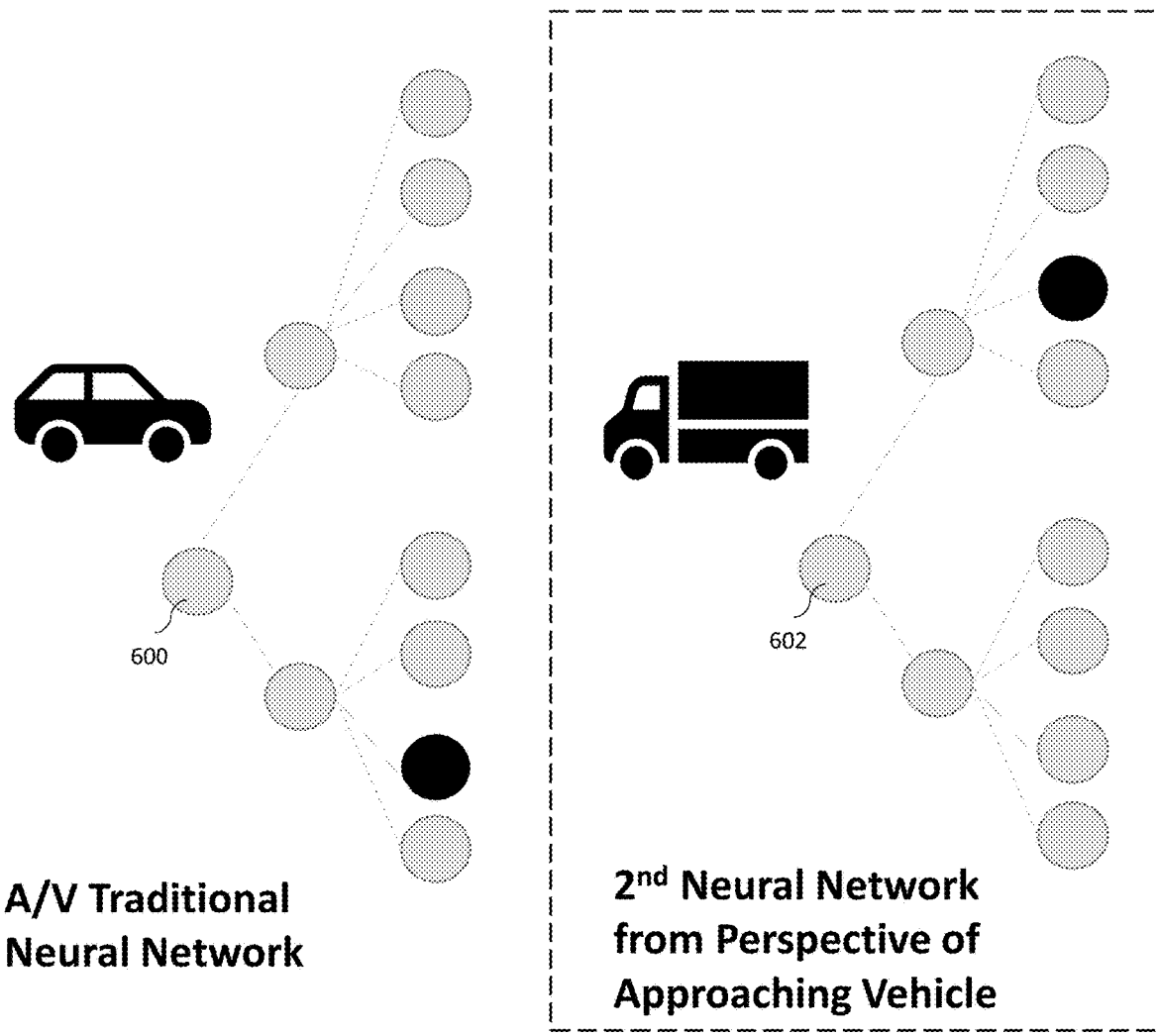
FIG. 6 depicts a plurality of neural networks processed for an autonomous vehicle and for a nearby vehicle from the perspective of the autonomous vehicle.

Referring now to FIG. 6, FIG. 6 depicts a neural network for the autonomous vehicle and a second neural network that the autonomous vehicle calculates for a nearby vehicle. This allows the autonomous vehicle to make determinations of objects for example from the autonomous vehicle's perspective. It also enables determinations to be made for nearby vehicle. In certain instances based on the available data, a similar neural network would result in different interpretations of objects and items. If the AV detects that a nearby vehicle may have a different understanding, identification, and perception of the environment, then the AV may take actions so as to increase the margin of error between itself and the nearby vehicle or further take actions so as to identify a potential discrepancy to the nearby vehicle. As an example, a messaging system may be enabled to alert a human driver in the nearby vehicle by the AV sending one or more messages on a millimeter wave length, cellular, WiFi, 802.11 variant to the nearby vehicle.

A convolution neural network may be used by both the AV and the AV's interpretation of the vantage point of the nearby vehicle. In this instance the data feeding into the AV may include digital images acquired by the AV. Pinpoints and wireframes of other vehicles may also be used by the AV.

Referring now to FIG. 7, FIG. 7 depicts a plurality of calculated paths and scenarios associated with the AV including predicted paths of nearby vehicles. A number of scenarios can be executed to create what is likely to occur between various paths that vehicles take. In this instance the variance associated with a given path may be identified. The probability that an object will take the set of paths as identified in path 4 is higher. This model takes into account predicted behavior of all the related vehicles to select a path that is likely to be the path for all the vehicles. Understanding the likely path of all the vehicles, the AV can then proceed to create a similar analysis of if it were to make a change to its path. Beyond determining that the path the AV takes would avoid a collision, the AV further could determine the likely paths of related vehicles given it takes a change. This would create a new state of vehicles in the environment. These states can be part of a state machine that is calculated by the AV. Each state can have associated with a safety and collision free score. Each state can further have a calculated value of the location of all objects and the changed position of each object. In order to facilitate faster compute times of state and environments, only changes to the environment and states may be calculated. Alternatively, only prioritized states may be calculated including those that have a collision free confidence interval above a threshold such as 95%.

Figure 8:
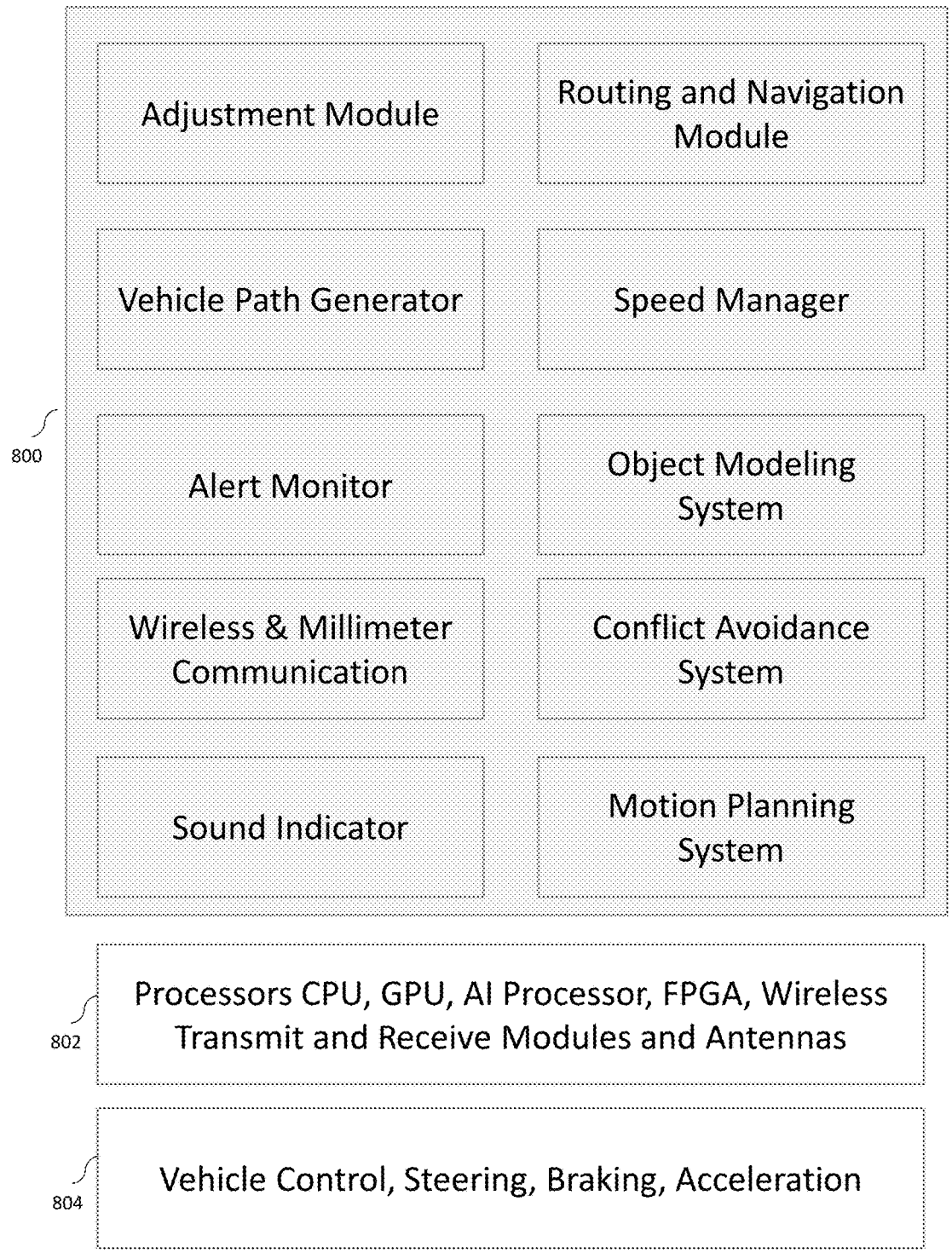
FIG. 8 depicts various modules of the autonomous vehicle for object perception.

Referring now to FIG. 8, FIG. 8 depicts various components and modules of the autonomous vehicle. These modules may be implemented in software stored in one or more non-transitory computer readable mediums for execution by one or more processors 802. A number of processors 802 may be utilized by the AV including CPUs, GPUs, specialized artificial intelligence processors, and FPGAs specifically developed for the calculation of various recognition programs and probabilistic movement models.

Still referring to FIG. 8, a variety of software modules may be implemented in a electronic system including a processor, memory, solid state drive (SSD), hard drive or other device within an autonomous vehicle or within a cloud server system. The cloud server system may include one or more compute resources including processors and one or more storage devices including hard drives and solid state drives.

These software modules 800 implemented in written code include instructions that are to be executed by a processor and stored within a non transitory computer readable medium. An adjustment module ensures that the steering of the vehicle is changed such that it is includes a configurable spacing of distance between the autonomous vehicle and a nearby object. As an example, a configurable parameter may include a 1.5 foot distance between the AV and any other object. The adjustment module may allow this to be customized based on the recognized and identified object. As an example, a safety distance of 2 ft may be applicable to a biker whereas a safety distance of 3 ft may be applicable to a large truck.

A vehicle path generator module instructs the steering system of the vehicle to proceed along a particular trajectory and further instructions the speed and acceleration at various time periods associated with the path. An alert module provides updates on a dashboard to a human user or a cloud based system to notify potential road hazards. A wireless communication module can determine the frequency and appropriate protocols to communicate with nearby vehicles and over cellular networks. A sound indicator module can activate a horn or other auditory systems including a pre-recorded instruction set such as to move out of the way or move left.

A speed manager module is enabled to instruct the vehicle to accelerate and brake at appropriate times. An object modeling system is enabled to create a behavioral model associated with various objects on the roadway. As an example, a tree may be modeled as a fixed position object whereas an animal can be modeled as a moving object. A conflict avoidance system provides direction to the autonomous vehicle to ensure that the vehicle takes a movement action to avoid a conflict. A motion planning system provides direction to the autonomous vehicle so that it is enabled to plan a set of movements for the autonomous vehicle and also a set of predicted movements for corresponding objects. These movement may include a primary path, aggressive path, and safety path to avoid collisions with various objects.

A variety of hardware components 802 are enabled to be integrated into the autonomous vehicle including one or more processors, CPUs, GPUs, AI processors, wireless transmit and receive modules, and antennas. The autonomous vehicle may be enabled for bi, tri, quad, and n band communication simultaneously across a plurality of frequencies and protocols.

The software systems 800 are enabled to control aspects of the autonomous vehicle functions including the vehicles steering, braking, acceleration, direction, lighting, and other aspects of the vehicle functions.

Figure 9:
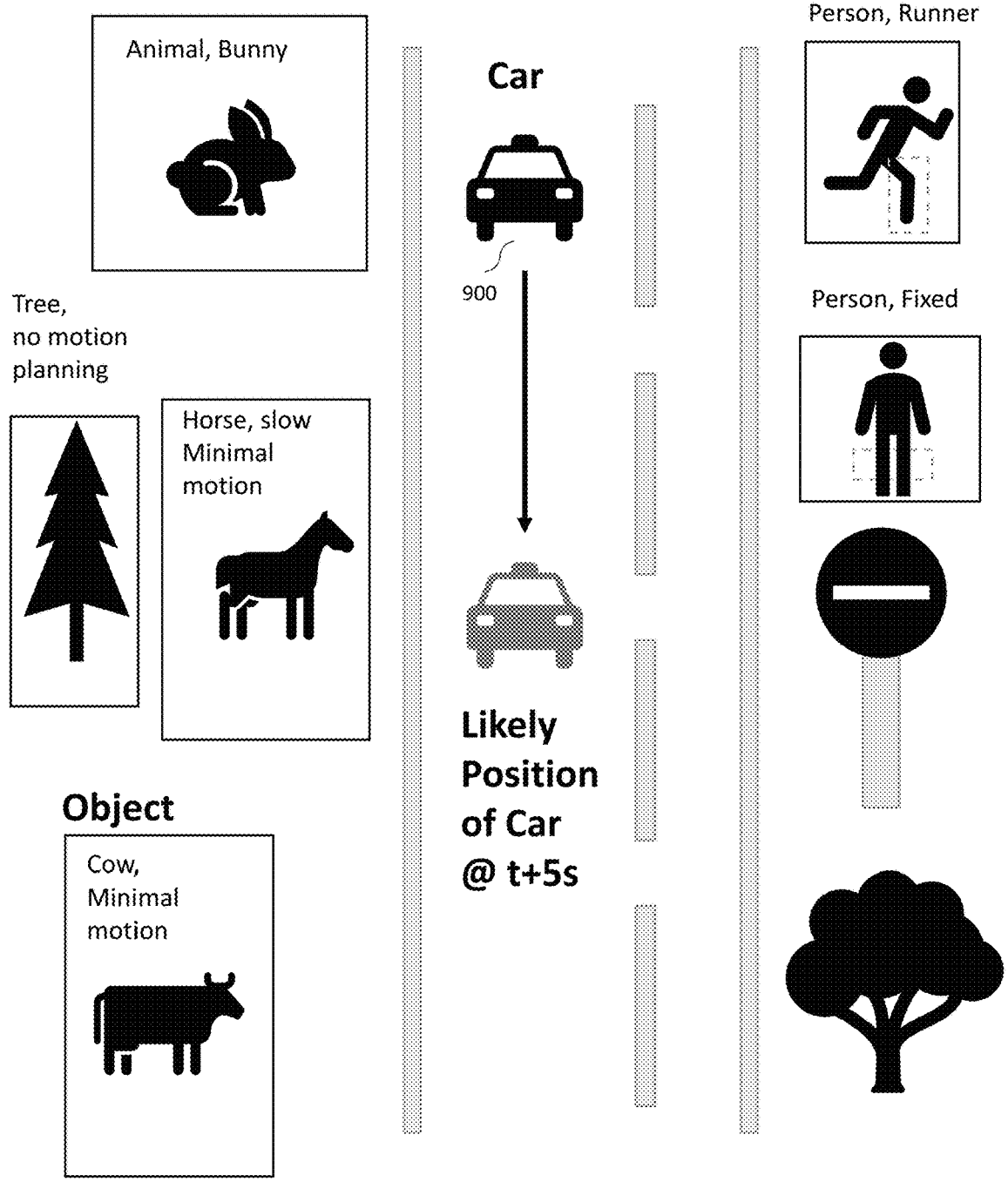
FIG. 9 depicts identification of various objects including sub-motions of object identified.

Referring now to FIG. 9, FIG. 9 depicts a view of an autonomous vehicle and various objects that are classified including predicted movements associated with objects. A car 900 may be identified by the AV. Its position may be predicted by the AV at a series of time periods. The AV may calculate the speed, heading, direction, and so forth of the vehicle. Various objects may be identified and classified as moving or stationary objects. The AV is enabled to efficiently filter out non moving object so as to not process movement from objects which are unable to move. The AV can further identity sub aspects of object such as a person running based on the position of their legs versus a person that is stationary.

Still referring to FIG. 9, there is an ability of the for the artificial intelligence learning system to be shared across several autonomous vehicles. In these instances, an object may be learned from one vehicle and may be sent to a cloud service and sent back to another vehicle. In a fast processing environment, there is a need to determine which objects to process and which objects that do not need recognition. That is determining the presence of an object can aid in an AV performing the appropriate motion planning around the object. Recognizing the object once its presence is known requires an additional compute resources of the AV by one or more processors or by one or more processors of a cloud server. In the latter case, a transmit and receive between the AV and a cloud server would be performed. In this cloud recognition case, the AV may prioritize object that are distant for cloud recognition. Meanwhile, objects that are proximate may be recognized locally. Further, the AV may be enabled to classify various objects by assigning categories of importance to objects and parallel processing the recognition and scoring of the objects.

Referring now to FIG. 10, FIG. 10 depicts a plurality of factors for recognizing objects. Certain aspects may already be learned from training data 1000. These items are listed below such as:

A human and a dog:
a) Person movement-total space consumed by person and dog off leash
b) Objects: Normal responsive to situation for a person
c) AV: No change to scoring for person. Score dog as lower priority than human. Avoid a proximity distance to dog off leash. Change scoring if dog on leash.

A person with a cane:
a) Person movement recognized as older person or disabled
b) Object: Less responsive to situation slower pace
c) AV: Reduce speed of vehicle below even speed limits.
d) AV: Score environment as more complex.
a) Object: link of hand between individuals, child may be unpredictable
b) AV: Reduce speed of vehicle
c) AV: Dedicate a camera to capture movement of one object
d) Prioritize in processor flow data acquired from camera fixed on child and couple movement.

The autonomous vehicle may accordingly account for these items and act in a coordinated fashion. These learnings may be embedded in a cloud based software system as a module and downloaded by the AV as part of periodic updates.

The AV may be enabled to learn new aspects 1002 based on newly applied training data. As an example the AV environment understanding system may identify four individuals and specifically identify that their eyes are not looking forward but instead in a distracted state. The AV may then proceed in a different fashion as outlined below:
a) Four individuals, eyes are not looking up. Audio signal detect conversations. Distracted state of group.
b) Object: Four individuals, distracted state
c) AV: Reduce speed of vehicle
d) AV: Dedicate microphone array to detect conversation and orient speaker configuration to provide warning to group if their approach is too close.

In an embodiment, the aggressive driving may be enabled by the autonomous vehicle based on the ability to full sense and perceive an environment surround the autonomous vehicle. In these instances, various paths may be calculated that maintain sufficient distances between objects.

It is an aspect of the present disclosure to enable for an aggressive driving move to be made by the autonomous vehicle in response to an observed environment. In this instance, an assessment of an environment can include a set of definable characteristics to enable an aggressive environment. These parameters may be enabled based on a plurality of cloud or vehicle based characteristics. In once embodiment, an aggressive driving mode may be enabled by the autonomous vehicle may be enabled based on a plurality of minimally viable paths, a recognition of a plurality of objects, an understanding of a plurality of paths of identified objects, and an predicted path of the recognized objects including a confidence level above a threshold. The threshold may further be configured.

In one embodiment, the aggressive driving mode may further be enabled based on a recognition of the an environment that includes a safety score of the environment. As an example, a city based environment may not be enabled for a city based environment. IN yet another instance, an aggressive driving mode may be enabled in a country environment or in an environment in which there are no pedestrians, bikers, or larger cars. These settings may be configurable and the aggressive mode of the autonomous vehicle may be in part based on the number of other recognized objects in the environment and the number of predicted objects in the environment.

An aggressive driving path may also be enabled by the autonomous vehicle, when the vehicles nearby are other autonomous vehicles in communication and coordination with each other. This communication and coordination may be enabled via a millimeter wave length, wireless, network, cloud or other peer to peer, direct, or cloud mediated communication. Upon coordination, the autonomous vehicle may be enabled to follow an aggressive path in response to said changes.

The aggressive driving mode may further be enabled responsive to the availability of a human driver. In this embodiment, the AV requires the human to perform one or more of actions including placing hands on a steering wheel, which can be determined by one or more sensors or cameras, the identification of lane markings on a road to guide the vehicle, an open area of a greater distance to enable a greater stopping distance at a higher speed, and other factors.

An aggressive driving move may further be enabled only upon a supervisory mode enabled by a remote cloud controlled driving center that is enabled to take over driving from the AV. Alternatively, if a previous vehicle proceeded through a path the sensory data can be transmitted to the cloud service. The cloud service may the precalculate environments for fixed objects and predictions of how other movements of moveable objects occurred. These calculated environments which includes scores for objects and cost functions of various paths may be sent directly to the AV. The AV then can start with a precalculated environment which includes one or more of identified and recognized objects, scored objects in terms of their move-ability, prediction paths of various objects, and a set of intended movement paths including a preferred priority associated with each.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed:

1. A system including an autonomous vehicle comprising:
   the autonomous vehicle configured with a LiDAR system including a plurality of LiDAR devices; the autonomous vehicle configured with a spinning LiDAR enabled device positioned on a top of the autonomous vehicle;
   a second LiDAR device positioned proximate to a front headlight of the autonomous vehicle;
   a third LiDAR device positioned proximate to a back bumper of the autonomous vehicle;
   wherein at least one LiDAR device is positioned on top of the autonomous vehicle;
   wherein at least one of the plurality of LiDAR devices is a multichannel LiDAR device;
   one or more processors configured to execute actions of:
   an identification module configured to identify and classify from a data one or more objects including a first object;
   an object trajectory module configured to determine a plurality of predicted paths of the first object including a probabilistic distribution of the plurality of predicted paths of the first object based on the identification of the first object;
   a path planning module of the autonomous vehicle configured to create a plurality of paths to avoid the first object and the plurality of predicted paths of the first object;
   wherein a number of paths generated by the path planning module is based on computing resources available;
   wherein a selected path of the plurality of paths to avoid the first object is based at least in part on a machine learning module configured to learn from a variability rating associated with a classification type of the first object and a database of objects and one or more attributes including a variance measure; and
   a state machine configured to generate at least two or more states in addition to a current state for the autonomous vehicle to proceed into based on a state change;
   the one or more processors configured to utilize at least two neural networks including a first neural network utilized to execute the path planning module of the autonomous vehicle, and
   wherein responsive to the execution of the actions by the one or more processors, the selected path is executed by the autonomous vehicle to move along the selected path.

2. The system of claim 1, wherein in the first object is determined to have one or more legs; and wherein the autonomous vehicle is configured to execute the selected path responsive to a detection of a pose.

3. The system of claim 1, wherein the identification module determines whether the first object of the one or more objects is above a speed limit and is human driven or autonomous; and wherein the identification module determines whether the first object is associated with an unpredictable behavior based on an artificial intelligence labeled training data set.

4. The system of claim 1, wherein the object trajectory module determines the plurality of predicted paths based on a profile of the classification type of the first object associated with a historical corresponding behavior of staying on an anticipated path; and wherein the path planning module determines a new path for the autonomous vehicle that comprises of an increased distance between the autonomous vehicle and the first object when the historical corresponding behavior is associated to a variability score above a threshold.

5. The system of claim 1, wherein the first object is a separate autonomous vehicle; wherein the autonomous vehicle is configured to be guided by the separate autonomous vehicle; and wherein the autonomous vehicle is configured for vehicle to vehicle communication including communication of at least one path between the autonomous vehicle and the separate autonomous vehicle over a wireless connection.

6. The system of claim 5, wherein a classification of the one or more objects are determined by a server prior to the autonomous vehicle entering an environment.

7. The system of claim 1, wherein the autonomous vehicle is configured to make a lurching movement to indicate likely movement prior to the autonomous vehicle moving on an aggressive motion path; and wherein the aggressive motion path is executed responsive to a communication with the first object or by a remote cloud device.

8. The system of claim 1, further comprising a priority schema to determine which of the one or more objects to process as the first object.

9. The system of claim 8, wherein a first group of the one or more objects is enabled for object identification and a subset of the first group is enabled for object recognition.

10. The system of claim 9, wherein at least part of the object recognition is performed by the autonomous vehicle and at least part of the object recognition is performed by a cloud server and/or an edge computing device.

11. The system of claim 1, wherein a scoring system scores the one or more objects with a variability score when the one or more objects are present in an intersection with a history of accidents.

12. The system of claim 11, wherein the autonomous vehicle recognizes the one or more objects and increases a physical space from the identified one or more objects when the autonomous vehicle is in the intersection with a recent accident.

13. A computer implemented method comprising:
   acquiring, by one or more sensor acquisition devices of an autonomous vehicle, a data of an environment;
   identifying, by an identification module, from the data one or more objects of the environment including an identification of a first object of the one or more objects to predict a plurality of likely movements of the first object;
   determining, by an object trajectory module, a plurality of predicted paths of the first object including a probabilistic distribution of the plurality of predicted paths of the first object based at least in part on the identification of the first object;
   generating by a path planning module at least two paths for the autonomous vehicle to avoid the first object and a plurality of predicted paths of the first object; wherein a number of paths generated by the path planning module is based on computing resources available;
   wherein the plurality of predicted paths of the first object is based on a machine learning module updated in a cloud system, the machine learning module configured to learn from a variability rating associated with the first object;

a database of objects and one or more attributes including a variance measure; and a state machine configured to generate at least two or more states in addition to a current state for the autonomous vehicle to proceed into based on a state;

one or more processors configured to utilize at least two neural networks including a first neural network utilized to execute the path planning module of the autonomous vehicle; and the autonomous vehicle configured with a LiDAR system including a plurality of LiDAR devices;

the autonomous vehicle configured with a spinning LiDAR enabled device positioned on top of the autonomous vehicle;

a second LiDAR device positioned proximate to a front headlight of the autonomous vehicle;

a third LiDAR device positioned proximate to a back bumper of the autonomous vehicle;

wherein at least one LiDAR device is positioned in on top of the autonomous vehicle;

wherein at least one of the plurality of LiDAR devices is a multichannel LiDAR device; and selecting a path from the at least two paths to execute, and wherein the autonomous vehicle is configured to move along said selected path.

14. The computer implemented method of claim 13, wherein instructing the autonomous vehicle to proceed on an aggressive motion path is further responsive to detecting a pose of a leg of the first object.

15. The computer implemented method of claim 13, wherein the identification module determines whether the first object of the one or more objects is above a speed limit and is human driven or autonomous; and wherein the identification module determines whether the first object is associated with an unpredictable behavior based on an artificial intelligence labeled training data set.

16. The computer implemented method of claim 13, wherein the object trajectory module determines the plurality of predicted paths based on a profile of a type of the first object associated with a historical corresponding behavior of staying on an anticipated path; and wherein the path planning module determines a new path for the autonomous vehicle that comprises of an increased distance between the autonomous vehicle and the first object when the historical corresponding behavior is associated to a variability score above a threshold.

17. The computer implemented method of claim 13, wherein the first object is a separate autonomous vehicle; wherein the autonomous vehicle is configured to be guided by the separate autonomous vehicle; and wherein the autonomous vehicle is configured for vehicle to vehicle communication including communication of at least one path between the autonomous vehicle and the separate autonomous vehicle over a wireless connection.

18. The computer implemented method of claim 17, wherein a classification of the one or more objects are determined by a server prior to the autonomous vehicle entering the environment.

19. The computer implemented method of claim 18, wherein the autonomous vehicle is configured to make a lurching movement to indicate likely movement prior to the autonomous vehicle moving on an aggressive motion path; and wherein the aggressive motion path is executed responsive to a communication with the first object or by a remote cloud device.

20. The computer implemented method of claim 13, wherein the autonomous vehicle recognizes the one or more objects and increases a physical space from the identified one or more objects when the autonomous vehicle is in an intersection with a recent accident.

\* \* \* \* \*